(12) United States Patent
Folz

(10) Patent No.: US 6,458,022 B1
(45) Date of Patent: Oct. 1, 2002

(54) SELF-CENTERING STEADY REST CLAMPING DEVICE

(75) Inventor: Peter Folz, Friedrichshafen (DE)

(73) Assignee: SMW Autoblok Spannsysteme GmbH (DE)

( * ) Notice: Subject to any disclaimer, the term of this patent is extended or adjusted under 35 U.S.C. 154(b) by 113 days.

(21) Appl. No.: 09/695,367

(22) Filed: Oct. 23, 2000

(30) Foreign Application Priority Data

Oct. 21, 1999 (DE) .......................................... 199 50 706

(51) Int. Cl.[7] .............................................. B24B 41/06
(52) U.S. Cl. .................... 451/365; 269/32; 269/196; 269/218; 451/379; 451/398
(58) Field of Search ............................ 269/25, 27, 218, 269/32, 34, 156, 35, 196, 229; 451/49, 246, 365, 379, 385, 398, 399, 402, 404

(56) References Cited

U.S. PATENT DOCUMENTS

| 4,650,237 A | * | 3/1987 | Lessway | |
| 5,201,501 A | * | 4/1993 | Fassler | 269/32 |
| 6,000,686 A | * | 12/1999 | Yates | 269/6 |
| 6,098,972 A | * | 8/2000 | Klimach et al. | 269/156 |
| 6,220,589 B1 | * | 4/2001 | Smith, III et al. | 296/156 |
| 6,279,885 B1 | * | 8/2001 | Leon, Jr. | 269/8 |
| H45 H | * | 4/1986 | Gilmore | 451/296 |

FOREIGN PATENT DOCUMENTS

| DE | 35 43 806 C2 | 6/1987 |
| EP | 0 796 698 B1 | 9/1997 |

* cited by examiner

Primary Examiner—Timothy V. Eley
(74) Attorney, Agent, or Firm—R W Becker & Associates; R W Becker

(57) ABSTRACT

A device in the form of a self-centering steady rest for clamping or holding workpieces on a machine tool is provided. Three holding members are supported in a separate, intermediate member that is disposed in a housing and is displaceable therein, toward and away from a workpiece, by means of a piston. Formed in the walls of the housing are control cams by means of which the outer holding members are pivotably guided via adjustment movements of the intermediate member.

9 Claims, 4 Drawing Sheets

Fig. 1

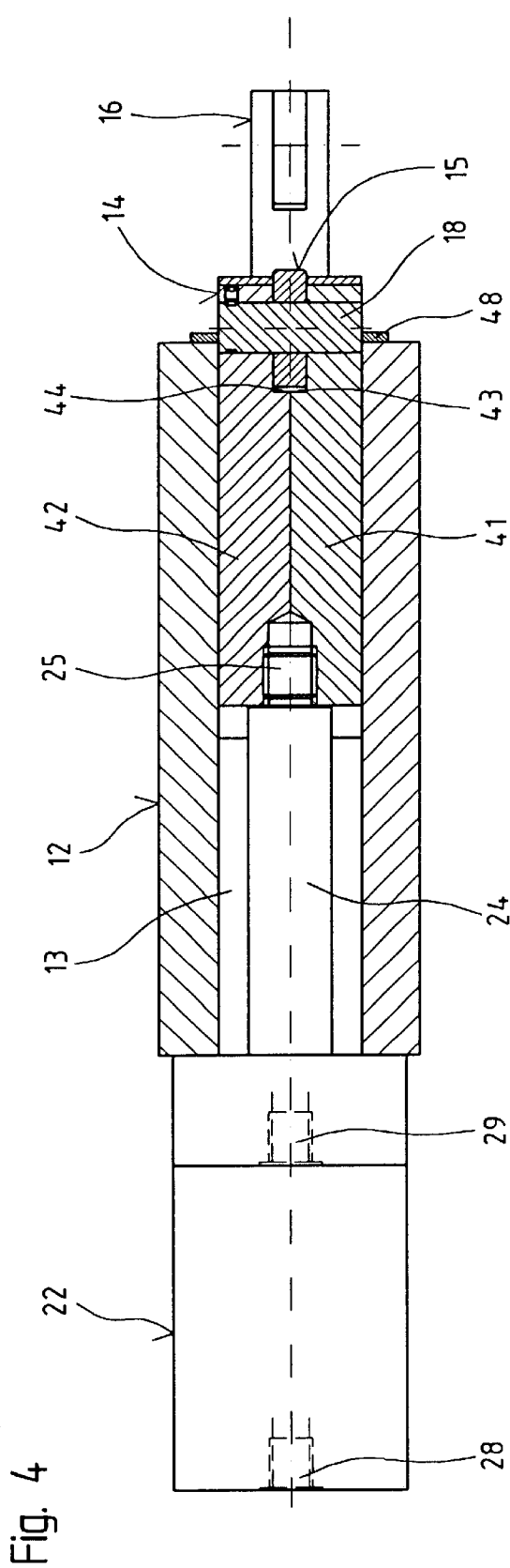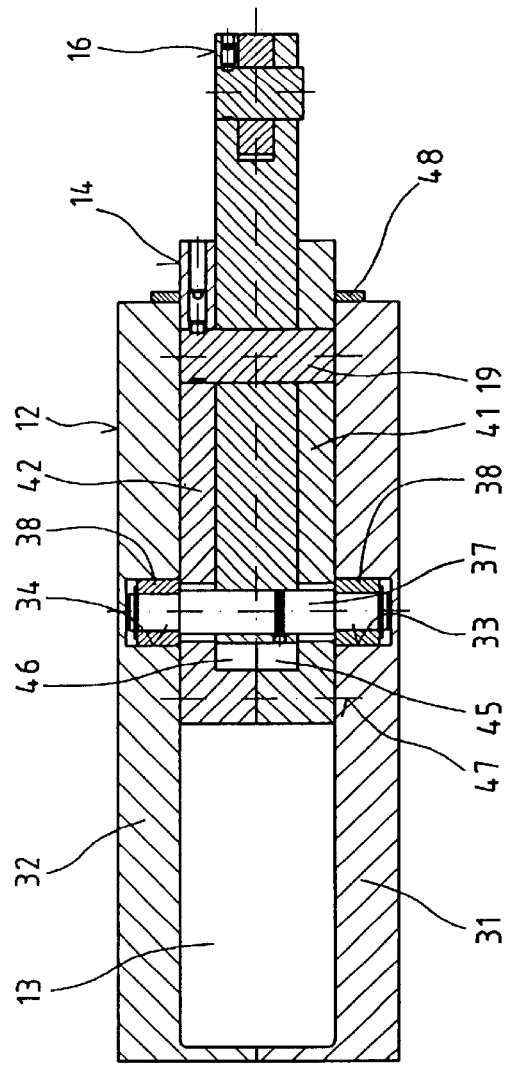

SELF-CENTERING STEADY REST CLAMPING DEVICE

BACKGROUND OF THE INVENTION

The present invention relates to a device for clamping and/or holding workpieces on a machine tool, e.g. on the work table of a grinder, and is embodied as a steady rest with three holding members that act on the workpiece to be held and that are disposed in the same plane and in a clampable housing and that can be actuated by a piston that is acted on by a pressure medium, of which members the two outer holding members are designed as mirror-image pivotable angle levers and can be adjusted in a controlled manner by means of control cams that cooperate with the free ends of the two outer holding members.

A steady rest of this type is known from DE 35 43 806 C2. For enlarging the insertion opening, in this design an additional adjusting movement of the center holding member can cause at least one of the two outer holding members to move beyond the clamping range of the steady rest. This is brought about in that the holding member has an articulated connection via a lever to the center holding member and the center holding member has a recess into which the end of the outer holding member can be introduced.

This steady rest has proved itself in practice in terms of holding workpieces on a lathe; however, it is not possible to use it with processing machines that have a flat bed, e.g., a grinder, because the holding members of the steady rest cannot be swivelled out of the loading region. For this to be possible, it would be necessary for the steady rest to move using a special slide. This would itself entail an additional work step and substantial complexity in terms of the construction. In addition, the repeatability accuracy would not be sufficient due to the change in the steady rest's position.

It is therefore an object of the invention to provide a device for clamping and/or for holding workpieces on a machine tool of the type specified in the foregoing such that the device does not impede the process of loading the machine tool. On the contrary, it should be possible to move the holding members of the steady rest such that the loading region of the machine tool is completely clear so that there is even no problem clamping workpieces that have a pivot circle, e.g. a crankshaft, in the machine tool. In addition, it should not be necessary to change the position of the steady rest; rather, the housing of the steady rest should always maintain the position it has assumed so that there is a high degree of repeat clamping accuracy. The construction should not be very complex, but the device should also have high operational reliability, be easy to use, and offer great clamping accuracy.

SUMMARY OF THE INVENTION

This objective is inventively achieved by a device for clamping and/or for holding workpieces on a machine tool of the type cited in the foregoing in that the three holding members are supported in a separate intermediate member that is connected directly or via interposed elements to the piston that is actuated by a pressure medium and by means of which the intermediate member can be displaced in the housing in the direction of the workpiece, and in that the control cams, by means of which the outer holding members can be pivoted by the adjusting movements of the intermediate member, are formed in the walls of the housing that run laterally adjacent to the two outer holding members.

It is useful to embody the center holding member as a roller rotatably borne in the intermediate member, with the end of the roller that faces the workpiece projecting, as a cylinder, or as a stationary slide element, whereby the axial length of a receiving space of the housing associated with the intermediate member is approximately the same as the length of the intermediate member and the parts of the outer holding members projecting therefrom.

It is also useful for the intermediate member to comprise two plates that can be clamped together so that it is easy to install the intermediate member and the holding members that are to be inserted therein.

The control cams inserted in the walls of the housing should each constitute a rectilinearly running in-feed region and an adjusting region associated with the pivot movements of the outer holding members, in which regions the outer holding members are guided by means of rollers borne on pins inserted therein. In order to avoid jams, the intermediate member should be provided with through-holes in the area of the pins that extend at least over the projected height of the control cams.

Furthermore expedient is affixing the piston, which acts on the intermediate member and which is actuated by pressure medium, preferably on both sides, directly to the intermediate member by means of a piston rod and inserting it in a cylinder that is securely connected to the housing. The receiving space of the housing and/or the interior of the intermediate member can also be acted upon by sealing air.

It is furthermore advantageous in terms of assembling the clamping device to provide the housing, on one of the longitudinal sides running parallel to the adjusting device of the intermediate member, with a projecting element by means of which the housing can be rigidly fixed directly or via an adapter to the tool table of the machine tool.

If a device for clamping and/or holding workpieces on a machine tool is embodied in accordance with the invention, it is very simple to completely remove the holding members of the steady rest from the loading region of a machine tool so that workpieces can be clamped unimpeded, especially on machine tools with a flat bed. The position of the housing of the clamping device is not changed; on the contrary, the holding members can be introduced into the housing by means of a servo-device that acts on the intermediate member carrying them, which servo-device is also used for feeding the outer holding members. Additional actuators are thus not required, nor does the installed position of the steady rest change, so that there is always a high degree of repeatable clamping accuracy.

The complexity of construction required for this is low if the control cams by means of which the outer holding members are actuatable are formed directly in the walls of the housing and are thus arranged stationary therein. Not only does this provide high clamping accuracy, but also available components are used, in this case the two side walls of the housing, so that the result is small structural width of the steady rest embodied as suggested. And since only a few components are necessary for holding the workpiece to be clamped, there is a high degree of operational reliability, the device is easy to use, and it has low susceptibility to interruptions.

BRIEF DESCRIPTION OF THE DRAWINGS

The objectives and advantages of the present invention will appear more clearly from the following description in conjunction with the accompanying schematic drawings, in which:

FIG. 1 illustrates one exemplary embodiment of the inventive clamping device in its starting position with an opened housing, in a partial axial crosssection;

FIG. 4 illustrates a cross-section through line IV - IV in FIG. 2; and,

FIG. 5 illustrates a cross-section through line V - V in FIG. 2.

DESCRIPTION OF PREFERRED EMBODIMENT

Figure 1:
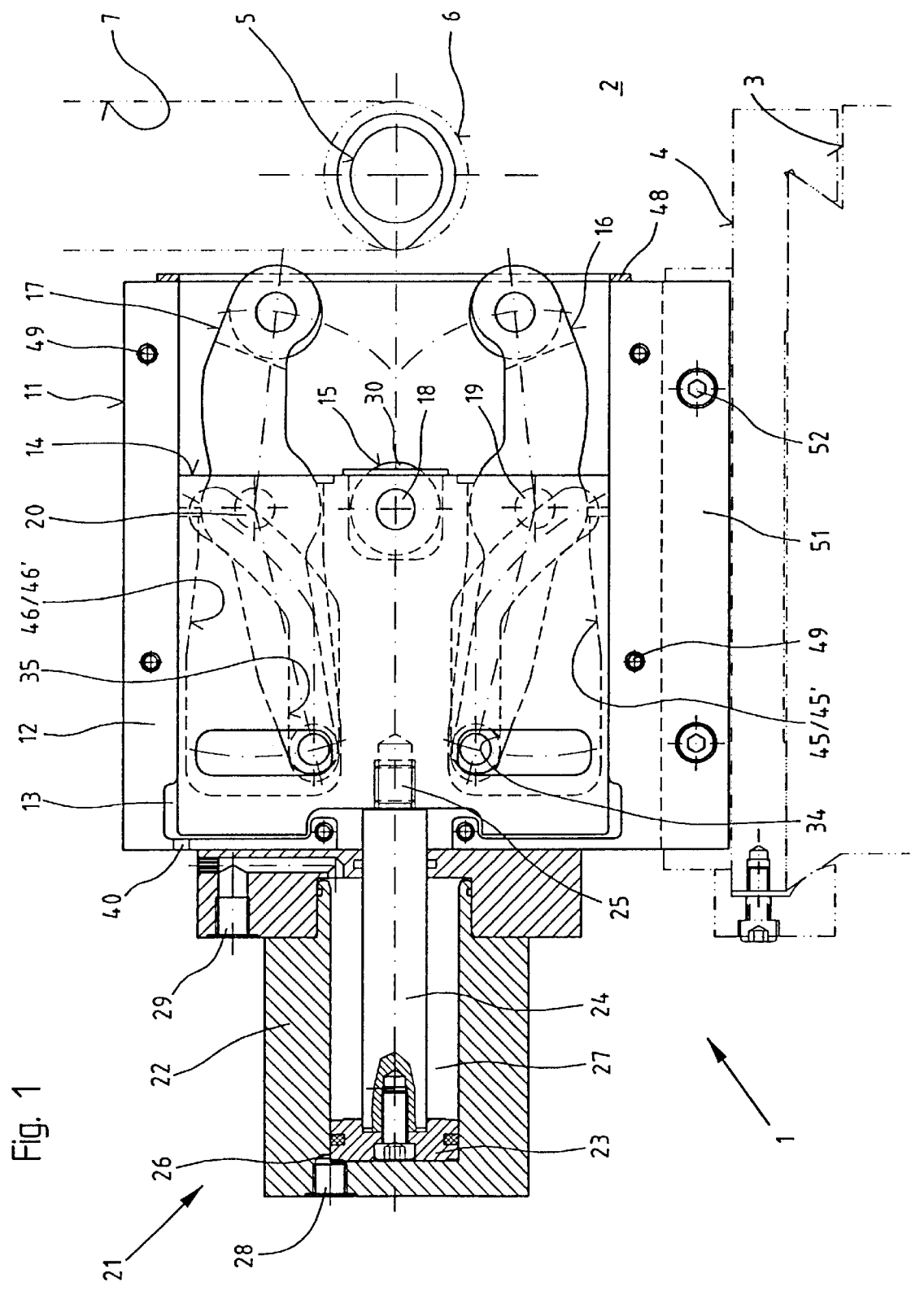
Figure 2:
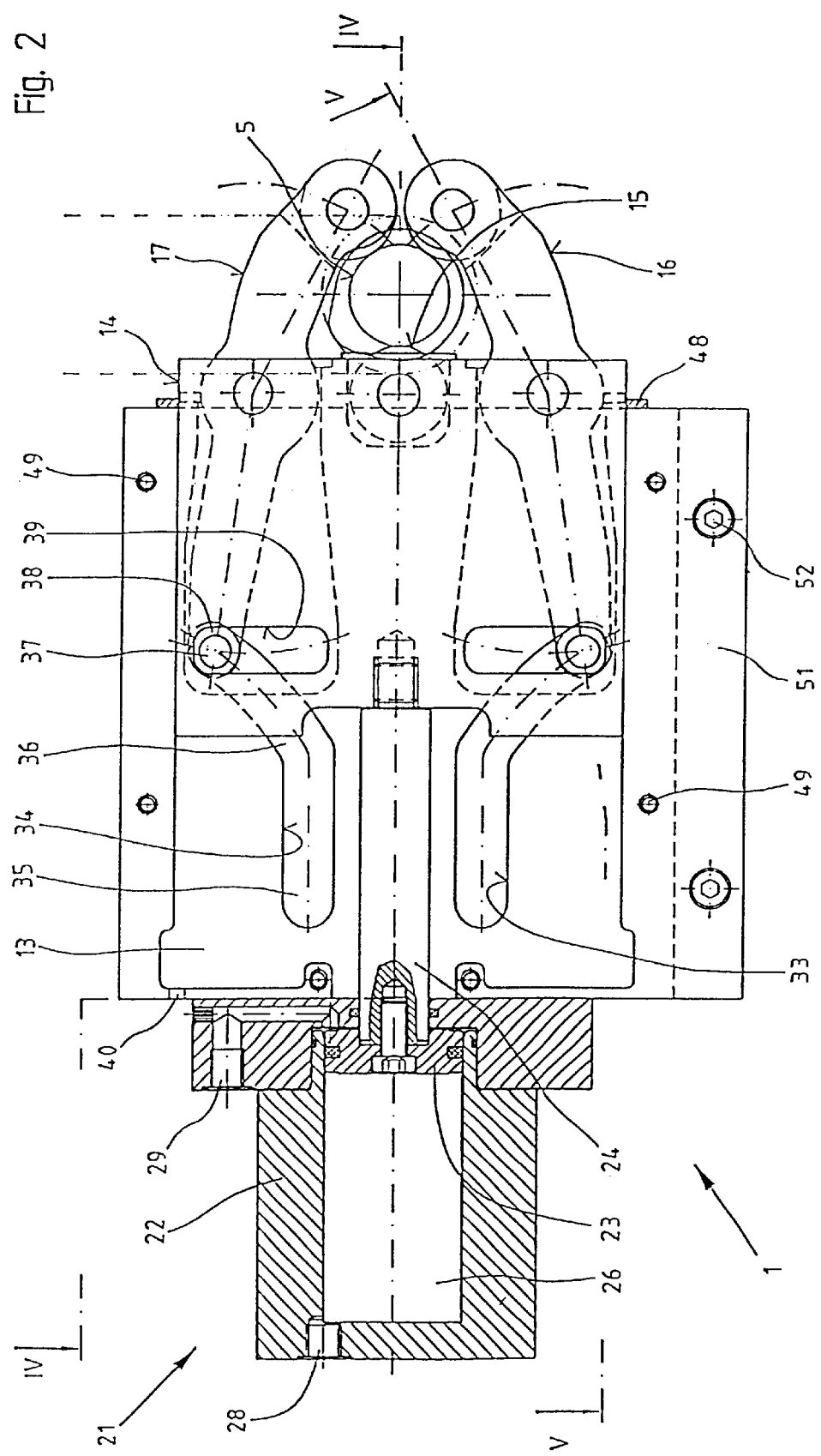
FIG. 2 illustrates the clamping device in accordance with FIG. 1 in the operational position.

The device labeled 1 and illustrated in FIGS. 1 through 4 clamps and/or holds a workpiece 5 on a machine tool 2, e.g. on its tool table 3, and is embodied as a type of self-centering steady rest 11, between the holding members 15, 16, and 17 of which the workpiece 5 is clamped in a self-centering manner. The centrically arranged holding member 15 and the two outer holding members 16 and 17 act approximately radially on the workpiece 5.

In order to remove the holding members 15, 16, and 17 together from the loading region 7 (indicated by the dot-dash lines in FIG. 1) of the machine tool 2 and thus to be able to insert the workpiece 5 unimpeded, the holding members 15, 16, and 17 are supported by means of pins 18, 19, and 20 at the same level (an offset arrangement is also possible, however) on an intermediate member 14 that is displaceably inserted in a housing 12 of the steady rest 11. The housing 12, which is embodied in two parts and is thus centrically divided, is also provided with a receiving space 13 in which the intermediate member 14 can be displaced from the starting position illustrated in FIG. 1 to the operating position in accordance with FIG. 2.

A servo-device 21 moves the intermediate member 14 in an adjustment direction S; the servo-device comprises a cylinder 22 flanged or otherwise attached to the housing 12 and a piston 23 inserted therein that is actuatable on both sides by pressure medium and the piston rod 24 of which is attached to the intermediate member 14 by means of a threaded element 25. Pressure medium can be alternately supplied via connections 28 and 29 to pressure chambers 26 and 27 so that the intermediate member 14 can be moved into the operating position illustrated in FIG. 2 when pressure medium is supplied to the pressure chamber 26.

However, during the adjusting movement of the intermediate member 14, not only are the holding members 15, 16, and 17 displaced in the direction of the workpiece 5, but at the same time the outer holding members 16 and 17 are pivoted. In order to make this possible, inserted into the walls 31 and 32 of the housing 12 are control cams 33 and 34 in which the free ends of the holding members 16 and 17 are pivotably guided. The control cams 33 and 34 each comprise a rectilinear adjusting region 35 and an in-feed region 36 by means of which the self-centering of the steady rest 11 is provided by equalizing the different in-feed movements of the center holding member 15, which is embodied as a roller 30, and the two outer holding members 16, 17. For this purpose, inserted into the free ends of the outer holding members 16 and 17 are pins 37 upon which rollers 38 are borne that engage the control cams 33 and 34, which are designed as grooves. In order to avoid jams, the intermediate member 14 is provided with corresponding through-holes 39 in the region of each of the pins 37.

In the illustrated exemplary embodiment, the intermediate member 14 comprises two plates 41 and 42 that are securely joined to each other by means of tightening bolts 47. Formed in the two plates 41 and 42 are recesses 43 and 44 for the center holding member 15, and recesses 45 and 46 and 45' and 46' for the two outer holding members 16 and 17. This simplifies the manufacture of the intermediate member 14 and the installation of the holding members 15, 16, and 17.

In order to prevent dirt from penetrating into the two-part housing 12, the two halves of which are securely joined together by means of screws 49, sealing air can be introduced therein via a connection 40, the sealing air exiting via the gap that necessarily results; furthermore, that side of the housing 12 that faces the workpiece 5 is provided with a seal 48.

Figure 3:
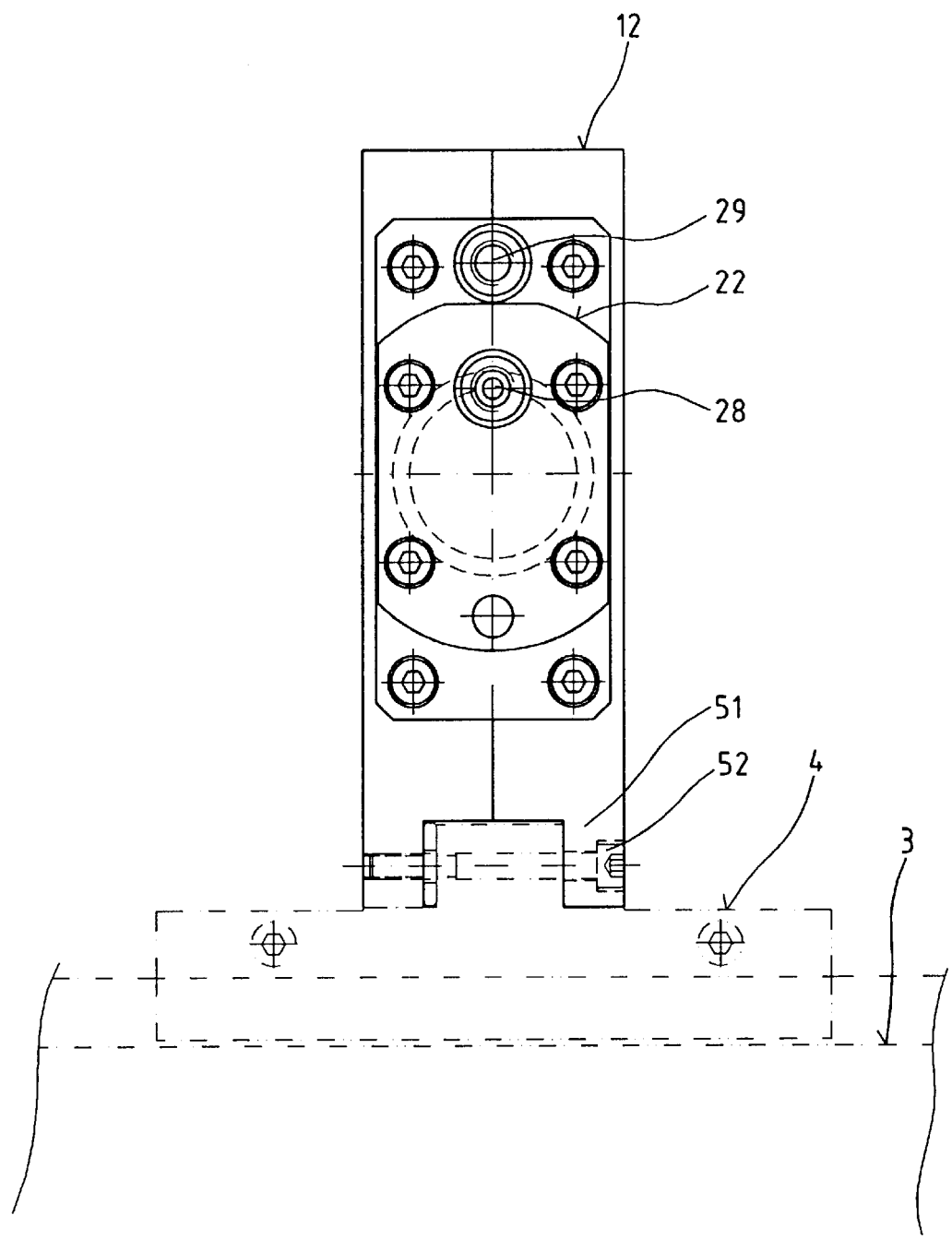
FIG. 3 illustrates the clamping device in accordance with FIG. 1 in a side elevation.

The device 1 accomplishes clamping on the machine tool table 3 using an adapter 4. As can be seen in FIG. 3, in order to be able to affix it to the adapter 4, the housing 12 is provided with a forked element 51 in which the adapter 4 engages. The housing 12 of the steady rest 11 is thus stationarily affixed to the table 4 by means of screws 52.

In the starting position shown in FIG. 1, the holding members 15, 16, and 17 of the device 1 are almost completely located in the housing 12 so that the workpiece 5, in the exemplary embodiment illustrated a crankshaft that has a pivot circle, can be placed unimpeded in the machine tool 2. The loading region 7 is thus freely accessible. Actuating the piston 23 by supplying the pressure medium to the pressure chamber 26 via the connection 28 displaces the piston along with the intermediate member 14 securely connected thereto, to the right. The holding members 15, 16, and 17 are thereby displaced in the direction of the workpiece 5, and the outer holding members 16 and 17 are linearly fed as they pass through the in-feed region 35 of the control cams 33 and 34 so that they can grasp the workpiece 5. However, as soon as the rollers 38 rest against the control cams 33 and 34 in their adjusting region 36, the outer holding members 16 and 17 pivot into the operating position illustrated in FIG. 2. The workpiece 5 is thus securely clamped in the area of the steady rest 11 by means of the three holding members 15, 16, and 17 and can be processed. Supplying pressure medium to the pressure chamber 27 of the cylinder 22 conversely causes the steady rest 11 to open again and clears the loading region 7.

The specification incorporates by reference the disclosure of German priority. document 199 50 706.6 of Oct. 21, 1999.

The present invention is, of course, in no way restricted to the specific disclosure of the specification and drawings, but also encompasses any modifications within the scope of the appended claims.

I claim:

1. A device, embodied as a steady rest, for clamping or holding a workpiece on a machine tool, comprising:

a housing;

a separate, intermediate member that is displaceably disposed in said housing, wherein said intermediate member is displaceable toward and away from a workpiece via a piston that is acted upon by pressure medium; and three holding members supported in a common plane in said intermediate member and adapted to act upon a workpiece that is to be held, wherein said three holding members include a central holding member that is fixedly connected to said intermediate member, and two outer holding members in the form of mirror-image mounted angle levers that are pivotably mounted in said intermediate member and are displaceable together by movement of said intermediate member, wherein for a controlled adjustment of said outer holding members, formed in walls of said housing that are adjacent to said outer holding members are control cams that cooperate with free ends of said outer holding member for a pivotal guiding of said outer holding members.

2. The device according to claim 1, wherein said central holding member extends beyond an end face of said intermediate member that faces a workpiece and is embodied as a rotatably mounted roller, a wheel, or a fixed slide.

3. The device according to claim 1, wherein said housing is provided with a receiving space for said intermediate member and has an axial length that corresponds approximately to a length of said intermediate member as well as a length of a portion of said outer holding members that extends beyond said intermediate member.

4. The device according to claim 1, wherein said intermediate member comprises two interconnectable plates, facing sides of which are provided with recesses for receiving said central holding member and said two outer holding members.

5. The device according to claim 1, wherein each of said control cams of said walls of said housing comprises a linear feed portion and an adjusting portion that is associated with pivot movements of said outer holding members, and wherein said free ends of said outer holding members are provided with pins on which are disposed rollers via which said outer holding members are guided in said portions of said control cams.

6. The device according to claim 5, wherein said intermediate member, in the region of said pins, is provided with through-holes that extend at least over a projected height of said control cams.

7. The device according to claim 1, wherein a cylinder is fixedly connected to said housing, wherein said piston, at least one end of which is acted upon by said pressure medium, is disposed in said cylinder, and wherein said piston has a piston rod that is connected directly to said intermediate member.

8. The device according to claim 1, wherein at least one of a receiving space of said housing and an interior of said intermediate member is adapted to receive sealing air.

9. The device according to claim 1, wherein a longitudinal side of said housing that extends parallel to a direction of displacement of said intermediate member is provided with a projecting element via which said housing can be fixed directly or via an adapter in place on a working table of said machine tool.

* * * * *